May 19, 1953     J. M. BARR     2,638,931

DIAPHRAGM

Filed Dec. 12, 1946

INVENTOR
John M. Barr
BY Lester W Clark
AGENT

Patented May 19, 1953

2,638,931

UNITED STATES PATENT OFFICE 2,638,931

DIAPHRAGM

John M. Barr, West Hartford, Conn., assignor, by mesne assignments, to Niles-Bement-Pond Company, West Hartford, Conn., a corporation of New Jersey Application December 12, 1946, Serial No. 715,786

13 Claims. (Cl. 137—793)

The present invention relates to diaphragms for differential pressure responsive mechanisms.

Such diaphragms are commonly formed of fabric impregnated with rubber or some rubber-like material. The diaphragm usually comprises a flat sheet in which an annular convolution is formed by molding under pressure after the application of uncured rubber to the fabric. The diaphragm then consists of a flat central portion and a flat annular edge portion, separated by the convolution. In use, the annular edge portion is usually clamped between two rigid members. Rigid reinforcing discs are also placed on the opposite sides of the flat central portion. When the diaphragm is subjected to pressure differences on its opposite sides, the central portion moves with respect to the edge portion. This movement is commonly utilized in differential pressure responsive mechanisms for various purposes, for example, to operate a valve or switch.

Difficulties have been experienced with such diaphragms for several reasons. One reason is that the forced molding of the convolution in the normally flat fabric sets up unequal stresses in the threads of the fabric. Such unequal stresses not only occur in the convolution itself, but in the adjacent flat portions which are maintained flat while the convolution is formed. The natural tendency of such flat portions would be to distort and twist as the convolution is formed. Since the fabric in that portion of the diahpragm is forced to remain flat during formation of the convolution, stresses are set up in the thread of the flat portions.

Another difficulty that has been encountered with such diaphragms is that the diaphragm is stressed in shear at the edges of the convolution, where it merges into the flat portion. When a differential pressure is applied to the diaphragm, it tends to tear the diaphragm at the edge of the convolution.

An object of the present invention is to provide an improved pressure differential responsive diaphragm.

Another object of the invention is to provide a differential pressure responsive diaphragm in which only the convolution is formed of flexible material.

A further object is to provide an improved differential pressure responsive diaphragm in which the flexible material is stressed only in tension and not in shear by the application of differential pressures.

A further object is to provide an improved method of constructing a differential pressure responsive diaphragm.

Figure 1:
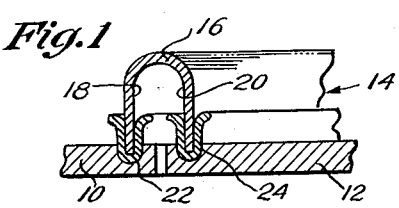
Figure 3:
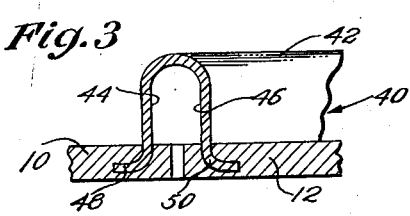
Figure 4:
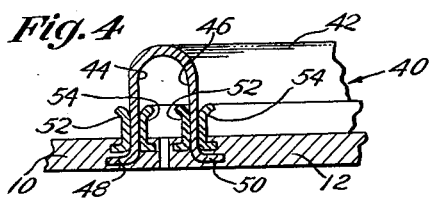
Figure 5:
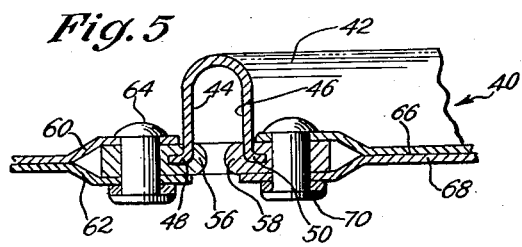
Figure 6:
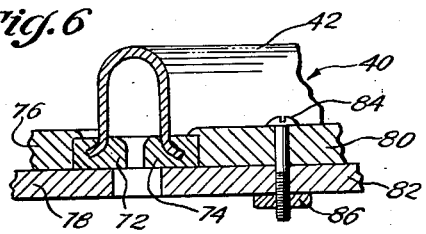
Figure 7:
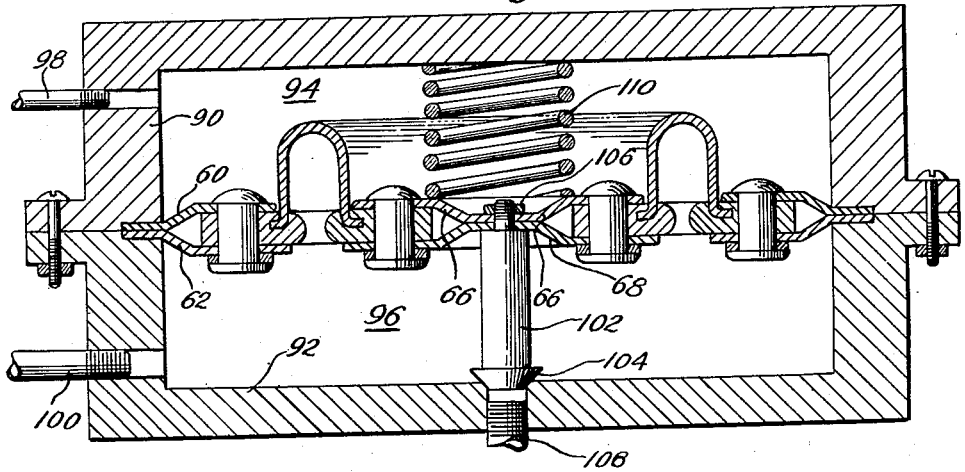

Other objects and advantages of the present invention will become apparent from a consideration of the appended specification, claims and drawing, in which Figure 1 represents a fragmentary cross-sectional view of a diaphragm constructed in accordance with the principles of my invention, Figures 2, 3, 4, 5 and 6 represent fragmentary cross-sectional views of modified forms of diaphragm construction using the principles of my invention, and Figure 7 illustrates a complete diaphragm, such as that shown in Figure 5, as utilized in a differential pressure operated valve mechanism.

In Figure 1, the complete diaphragm consists of a rigid outer annular member 10 and a rigid central disc member 12. These rigid members are joined by a flexible member 14. The flexible member 14 is preferably formed of fabric impregnated with rubber or rubber-like material. Where the term rubber is used hereafter in this specification and claims, it should be understood that this term is intended to be generic to rubber and all other plastic materials having similar properties.

The flexible member 14 comprises a convolution 16 of substantially semi-circular cross-section and straight-sided tubular portions 18 and 20 on opposite sides of the convolution 16. The edges of the tubular portions 18 and 20 are clamped in U-shaped ring members 22 and 24. The ring members 22 and 24 are molded in the rigid members 10 and 12, which are preferably formed of plastic or other suitable moldable material.

In constructing a diaphragm as shown in Figure 1, it is first necessary to form the flexible member 14. This is preferably done by molding under pressure an annular convolution to which uncured rubber has been applied. After the flexible member has been formed as shown in the drawing, the U-shaped ring members 22 and 24 are clamped to its edges, by placing the edges in the open end of the U and pinching the sides together. The assembly consisting of the flexible member 14 and the rings 22 and 24 is then placed in a suitable mold, and the rigid members 10 and 12 are molded around the ring members 22 and 24. A secure bond is thus formed between the rigid members 10 and 12 and the flexible member 14.

It should be noted that the tubular portions 18 and 20 of the flexible member 14 are not adjoined by flat portions, so that the stresses usually set up by molding such members with adjoining flat portions are avoided. It should also be noted that the tubular portions 18 and 20 extend substantially at right angles to the rigid members 10 and 12, so that stresses of the flexible member 14 due to the application of a differential pressure to the diaphragm structure are stresses in tension and not in shear. The flexible member 14 does not rest on a corner of either of the rigid members 10 and 12, as is the case in the usual diaphragm construction.

Figure 2:
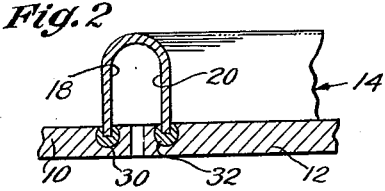

There is shown in Figure 2 a modified form of diaphragm construction in which the flexible member 14 may be the same as shown in Figure 1. After it is formed, rubber beads are molded on its edges, as shown at 30 and 32. The rubber beads 30 and 32 are then molded into the rigid members 10 and 12. The molded rubber beads 30 and 32 take the place of the metal rings 22 and 24 of Figure 1.

There is shown in Figure 3 a modified form of diaphragm construction in which the flexible member is formed somewhat differently. The flexible member is shown at 40, and has a convolution 42 and straight-sided tubular portions 44 and 46 corresponding to the convolution 16 and tubular portions 18 and 20, Figures 1 and 2. However, instead of terminating at the end of the tubular portions, the edges of the flexible member 40 continue into edge portions 48 and 50 of irregular formation. These edge portions 48 and 50 are not rigidly held during the process of molding the flexible member, so they can assume whatever shape is necessary to relieve their own internal stresses. After the flexible member is formed, it is molded directly into the rigid members 10 and 12, the edge portions 48 and 50 serving as anchors for the flexible member.

There is shown in Figure 4 a modification of the structure of Figure 3. In the Figure 4 arrangement, each of the tubular portions 44 and 46 is provided with a pair of reinforcing rings 52 and 54. The structure is otherwise the same as in Figure 3.

Figure 5 illustrates another modified form of diaphragm construction. Here the flexible member 40 is formed the same as the member 40 of Figure 3. However, the edge portions 48 and 50 are molded into a pair of rubber rings 56 and 58, respectively. The ring 56 is clamped between a pair of plates 60 and 62 by means of a rivet 64. The ring 58 is similarly clamped between a pair of plates 66 and 68 by means of a rivet 70.

Figure 6 illustrates a modification of the structure shown in Figure 5. Here the edge portions of the flexible member 40 are molded within rubber ring members 72 and 74. The ring 72 is clamped between a pair of plates 76 and 78, and the ring 74 is clamped between a pair of plates 80 and 82. The ring 74 is clamped by means of a bolt 84 and nut 86. Any equivalent clamping mechanism may be used by means of which considerable clamping pressure may be brought to bear on the rings 72 and 74 so as to form a leak-proof structure.

It should be noted that in each of the modifications shown, the tubular portions of the flexible member are not adjoined by perfectly flat portions, so that the internal stresses set up in the flexible member by the molding process are avoided. Also, it should be noted that the flexible member in each case extends at right angles to the rigid member, and that it extends in each case a substantial portion of its length into the rigid member, so that the stresses applied to the flexible member by the application of a pressure differential to the diaphragm are tension stresses rather than shear stresses.

In Figure 7 the diaphragm structure of Figure 5 is shown as used in a pressure differential responsive valve mechanism. The plate members 60 and 62 are clamped between upper and lower castings 90 and 92 which together form a housing for the valve mechanism. The diaphragm structure separates the housing into two expansible chambers 94 and 96. A suitable fluid pressure is communicated to chamber 94 through conduit 98 and a greater fluid pressure is communicated to chamber 96 through a conduit 100. The stem 102 on the valve 104 is clamped to the plates 66 and 68 by means of a nut 106. The valve 104 engages a seat formed on the casting 92 and controls the flow of fluid from chamber 96 through an outlet conduit 108. A spring 110 biases the valve 104 to closed position.

Whenever the pressure differential between chambers 94 and 96 exceeds the value determined by the strength of spring 110, the central portion of the diaphragm assembly moves up, opening the valve.

The terms and expressions which I have employed are used as terms of description and not of limitation, and I have no intention in the use of such terms and expressions, of excluding any equivalent of the features shown and described or portions thereof, but recognize that various modifications are possible within the scope of the appended claims.

I claim as my invention:

1. A differential fluid pressure responsive diaphragm comprising a rigid annular member, a rigid central disc member having a diameter smaller than the inner diameter of said annular member, a thin flexible annular element connecting said members, said element having a convolution with straight, tubular sidewalls terminating in outwardly extending flanges, and means connecting said flanges to said members in substantially parallel relation thereto, so that said element is stressed only in tension and not in shear by the application of a differential fluid pressure to said diaphragm.

2. A differential fluid pressure responsive diaphragm comprising a rigid annular member, a rigid disc member concentric with and spaced from said annular member, an annular element of thin flexible material adapted to connect said members, said element having an annular convolution with straight tubular sidewalls terminating in outwardly flared flanges substantially at right angles with sidewalls, and rounded joints attaching said flanges to said members in substantially parallel relation thereto, so that said element is stressed only in tension and not in shear at said joints by the application of forces acting parallel to said tubular portions.

3. A differential fluid pressure responsive diaphragm comprising a rigid annular member, a rigid disc member concentric with and spaced from said annular member, an annular element of thin flexible material adapted to connect said members, said element having an annular convolution with straight tubular sidewalls terminating in outwardly extending flanges, and means connecting said flanges to said members with said flanges lying within and fastened to said connecting means, so that said element is stressed only in tension by forces acting parallel to said tubular portions.

4. A differential fluid pressure responsive diaphragm comprising a rigid annular member, a rigid disc member concentric with and spaced from said annular member, an annular element of thin flexible material adapted to connect said members, said element having an annular convolution and straight tubular sidewalls with flanges extending outwardly substantially at right angles on opposite sides of said convolution, and resilient means connecting said flanges to said members so that said element is stressed only in tension by forces acting on said members parallel to said tubular portions.

5. A differential fluid pressure responsive diaphragm comprising a rigid annular member, a rigid disc member concentric with and spaced from said annular member, an annular element of thin flexible material adapted to connect said members, said element having an annular convolution and straight tubular sidewalls with flanges extending substantially at right angles on opposite sides of said convolution, said members having at least their adjacent edge portions formed of molded material, and having said flanges fastened within said edge portions so that said element is stressed only in tension by forces acting on said members parallel to the tubular portions of said element.

6. A differential fluid pressure responsive diaphragm comprising a rigid annular member, a rigid disc member concentric with and spaced from said annular member, an annular element of thin flexible material adapted to connect said members, said element having an annular convolution and straight tubular sidewalls with flanges extending substantially at right angles on opposite sides of said convolution, and means clamping said flanges to said members with uniform pressures so that said flanges are uniformly compressed and said element is stressed only in tension by forces acting on said members parallel to said tubular portions.

7. A differential fluid pressure responsive diaphragm comprising a rigid annular member, a rigid disc member concentric with and spaced from said annular member, an annular element of thin flexible material adapted to connect said members, said element having an annular convolution and straight tubular sidewalls terminating in outwardly extending flanges on opposite sides of said convolution, and a pair of rings of molded material, said rings having said flanges molded therein, and means clamping said rings to said members so that said portions are substantially perpendicular to said members.

8. A differential fluid pressure responsive diaphragm comprising a rigid annular member, a rigid disc member concentric with and spaced from said annular member, and a thin flexible annular member adapted to connect said rigid members, said flexible member having an annular convolution and straight tubular sidewalls with flanges extending outwardly substantially at right angles on opposite sides of said convolution, and a ring connecting one edge of each of said flanges with one of said rigid members, said ring being molded integrally with one of its associated members and engaging the other of its associated members.

9. A differential fluid pressure responsive diaphragm comprising a rigid annular member, a rigid disc member concentric with and spaced from said annular member, and a thin flexible annular member adapted to connect said rigid members, said flexible member having an annular convolution and straight tubular sidewalls terminating in outwardly extending flanges on opposite sides of said convolution, and a ring connecting each of said flanges with one of said rigid members, said rigid members having at least their adjacent edge portions formed of molded material and having one edge of said ring molded within said edge portion so that the tubular portions of said flexible member extend perpendicularly to said rigid members.

10. A differential fluid pressure responsive diaphragm comprising a rigid annular member, a rigid disc member concentric with and spaced from said annular member, and a thin flexible annular member adapted to connect said rigid members, said flexible member having an annular convolution and straight tubular sidewalls with flanges extending outwardly substantially at right angles on opposite sides of said convolution, at least the adjacent edge portions of said rigid members being formed of molded material and having a part of the tubular and all of said flange portions of said flexible member fastened within said adjacent edge portions so that the tubular portions of said flexible member extend perpendicularly to said rigid members.

11. A differential fluid pressure responsive diaphragm comprising a rigid annular member, a rigid disc member concentric with and spaced from said annular member, an annular element of thin flexible material adapted to connect said members, said element having an annular convolution and straight tubular sidewalls terminating in outwardly flared flanges parallel to said rigid members, on opposite sides of said convolution, and a pair of rings of molded material, each of said rings having a substantial length of said tubular portion, all of said flange portions of said element molded therein, and means for fastening said rings to said members so that said portions are substantially perpendicular to said members.

12. A differential fluid pressure responsive diaphragm comprising a rigid annular member, a rigid disc member concentric with and spaced from said annular member, an annular element of thin flexible material adapted to connect said members, said element having an annular convolution with straight tubular sidewalls terminating in outwardly curved flanges on opposite sides of said convolution, and a pair of contoured rings clampingly engaging a part of said sidewalls, said members having at least their adjacent edge portions formed of moldable material, and having a pair of said rings and said flanges molded within said edge portions so that said element is stressed only in tension by forces acting on said members parallel to the tubular portions of said element.

13. A differential fluid pressure responsive diaphragm comprising a rigid annular member, a rigid disc member concentric with and spaced from said annular member, and a thin flexible annular member adapted to connect said rigid members, said flexible member having an annular convolution with straight tubular sidewalls terminating in outwardly curved flanges on opposite sides of said convolution, and two pairs of reinforcing rings, one pair lying on either side of a part of said sidewalls, said rigid members having at least their adjacent edge portions formed of moldable material, and having said flanges with a part of said reinforcing rings molded directly within said adjacent edge portions so that the tubular portions of said flexible member extend perpendicularly to said rigid members.

JOHN M. BARR.

References Cited in the file of this patent
UNITED STATES PATENTS

| Number | Name | Date |
| --- | --- | --- |
| 2,218,090 | Marinsky | Oct. 15, 1940 |
| 2,272,327 | Sauzedde | Feb. 10, 1942 |
| 2,275,712 | Zand | Mar. 10, 1942 |
| 2,330,797 | Bohannan | Oct. 5, 1943 |